US009216435B2

(12) United States Patent
Delgado Sánchez et al.

(10) Patent No.: US 9,216,435 B2
(45) Date of Patent: Dec. 22, 2015

(54) METHOD FOR THE PREPARATION OF GRAPHENE OR GRAPHENIC MATERIALS FILMS ON NON-METAL SUBSTRATES

(71) Applicant: ABENGOA SOLAR NEW TECHNOLOGIES, S.A., Seville (ES)

(72) Inventors: José María Delgado Sánchez, Seville (ES); Emilio Sánchez Cortezon, Seville (ES); Pedro Atienzar Corvillo, Seville (ES); Ana Maria Primo Arnau, Seville (ES); Hermenegildo García Gómez, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 304 days.

(21) Appl. No.: 13/758,415

(22) Filed: Feb. 4, 2013

(65) Prior Publication Data

US 2013/0209793 A1 Aug. 15, 2013

Related U.S. Application Data

(60) Provisional application No. 61/606,743, filed on Mar. 5, 2012.

(30) Foreign Application Priority Data

Feb. 6, 2012 (ES) .................................. 201200100

(51) Int. Cl.
| | | |
|---|---|---|
| *C01B 31/00* | (2006.01) | |
| *B05D 5/12* | (2006.01) | |
| *H01B 1/04* | (2006.01) | |
| *C01B 31/04* | (2006.01) | |

(Continued)

(52) U.S. Cl.
CPC . *B05D 5/12* (2013.01); *B82Y 30/00* (2013.01); *B82Y 40/00* (2013.01); *C01B 31/0446* (2013.01); *H01B 1/04* (2013.01); *C01P 2006/40* (2013.01); *Y10T 428/265* (2015.01); *Y10T 428/30* (2015.01)

(58) Field of Classification Search
CPC ............ C01B 31/0438; C01B 31/0446; C01B 31/0461
See application file for complete search history.

(56) References Cited

U.S. PATENT DOCUMENTS

2011/0017493 A1* 1/2011 Gibson et al. .............. 174/126.1
2011/0033677 A1 2/2011 Shin et al.

OTHER PUBLICATIONS

Ruiz-Hitzky et al., "Supported Graphene from Natural Resources: Easy Preparation and Applications," 2011, Adv. Mater. 23, pp. 5250-5255.*

(Continued)

*Primary Examiner* — Robert Vetere
(74) *Attorney, Agent, or Firm* — Kilpatrick Townsend & Stockton LLP

(57) ABSTRACT

The present invention describes a method for the preparation of graphene or graphenic material films by the carbonization of biopolymers.
The method comprises the following stages:
- preparation of an aqueous solution of a non-crystallizable water-soluble biopolymer or a derivative of said biopolymer at the suitable pH,
- coating of the substrate with the aqueous solution of the biopolymer prepared in the previous stage by immersion of the substrate in said solution or by using the spin coating technique,
- conditioning of the aqueous solution of the biopolymer by means of a hydrothermal process consisting of subjecting the coated surface to a flow of nitrogen saturated with water vapor at the temperature of between 100 and 250° C. for a time between 30 minutes and several hours,
- thermal decomposition of the biopolymer deposited on the substrate in the absence of oxygen at temperatures below 1200° C.

20 Claims, 3 Drawing Sheets

(51) Int. Cl.
*B82Y 30/00* (2011.01)
*B82Y 40/00* (2011.01)

(56) References Cited

OTHER PUBLICATIONS

Ruiz-Hitzky et al. "Supported Graphene from Natural Resounds: Easy Preparation and Applications". *Advanced Materials*, vol. 23, pp. 5250-5255 (2011).

Ting-Kuo Fey et al. "Synthesis and characterization of pyrolyzed sugar carbons under nitrogen or argon atmospheres as anode materials for lithium-ion batteries". *Materials Chemistry and Physics*, vol. 73, pp. 37-46 (2002).

Gomex-Aviles et al. "Multifunctional materials based on graphene-like/sepiolite nanocomposites". *Applied Clay Science*, vol. 47, pp. 203-211 (2010).

* cited by examiner a)

b)

METHOD FOR THE PREPARATION OF GRAPHENE OR GRAPHENIC MATERIALS FILMS ON NON-METAL SUBSTRATES

This application claims priority to Spanish Patent Application No. P201200100 filed Feb. 6, 2012, and also claims the benefit of U.S. Provisional Patent Application No. 61/606,743 filed Mar. 5, 2012.

FIELD OF THE INVENTION

The present invention relates to a method for the preparation of graphene or graphenic materials films on non-metal substrates from biopolymers, for its application mainly in the microelectronics and photovoltaic industry.

STATE OF THE ART

Graphene is one of the more attractive materials for applications in microelectronics due to its conductive properties, as well as to its transparency and flexibility. The formation of films from this material covering a surface or deposited on it can serve for the preparation of optoelectronic devices. Conventionally, graphene films can be prepared by deposition of steam from methane and other organic compounds on metal surfaces. This type of process is characterized in that temperatures higher than 1000° C., typically 1500° C. are required, and in that the metal surface acts as a catalyst promoting the decomposition of the organic compound to graphene, a process that would not take place in the same conditions on a surface that was not made of metal.

An alternative described for the steam deposition consists of coating the metal surface by some organic compound and its pyrolysis in the absence of oxygen to form graphene. This process also requires that the thermal treatment is carried out on a metal surface where the metal atoms act as template agents generating the benzene rings. Nickel is one of the preferred metals for the preparation of graphene by thermal treatment of organic compounds. Once graphene has been obtained on a surface, it can be transferred to any other of several ways among which the use of an adhesive tape that adheres to the graphene and removes it from the metal substrate and allows to place it on another surface is included or through dissolution of the metal layer by attack with chemical reagents whereby the graphene sheet can pass to the solution. In this way, although graphene formation according to the method described in the state of the art requires a metal surface, it is possible to subsequently place graphene in any other type of surface by means of additional stages.

These precedents necessarily require the use of metal surfaces for the preparation of the graphene layers, since high temperatures are necessary for the graphitization of the graphene precursor. For this reason, these methods are limited to a series of substrates where the graphene film is synthesized and is not applicable to glass or plastic surfaces, among others. However, the use of metal substrates has the drawback that they are not transparent and, therefore, they must be removed by using additional, expensive and time-consuming processes, especially if they are used in photovoltaic solar industry that requires transparent substrates. It would be of interest to be able to prepare graphene layers on any type of surface for its direct application, e.g. on transparent substrates for application in solar cells.

US2011/0033677 describes a method for preparing a graphenic substrate, which may be a metal or non-metal substrate, but this method necessarily requires the placement of a catalyst layer on the precursor compound of the graphene before carrying out the graphitization of the same.

Among the different ways for carrying out the carbonization/graphitization reaction of carbon precursors, the ovens under inert atmosphere and absence of humidity stand out, and other ways for carrying out the carbonization/graphitization reaction are the microwave ovens, etc. The present invention describes the preparation of this type of graphene films or of a material consisting of several graphene layers on any substrate, and more specifically any non-metal substrate, such that it is not necessary to transfer the graphene layer to another more suitable substrate, dispensing with intermediate stages to remove the metal and consequently, the cost of the heating and cooling process and the time spent on the graphene formation process.

DESCRIPTION OF THE INVENTION

The present invention describes a method for the preparation of graphene or graphenic materials films from water-soluble biopolymers that can gelify in water (forming hydrogels), without the need of using a catalyst. The capacity for forming hydrogel implies a compatibility with the water that allows the conformal coating of surfaces from aqueous solutions with appropriate viscosity. Biopolymers have an unexpected ease for forming homogeneous thin films on some kind of substrates without appearing defects such as holes ("pinholes") or cuts ("cracks") with a uniform thickness and conformally with the surface.

Biopolymer aqueous solutions at suitable pH and functionalized biopolymers arranged on a surface can be turned into graphene or graphene multilayers by heating in the absence of oxygen. A preferred application of this invention uses non-crystallizable natural polysaccharide-type biopolymers among which there are alginate, chitosan, starch and carragenates of any origin, natural or synthetic, as well as the derivatives of these polysaccharides. The diversity of origin and nature of these polysaccharides, their nitrogen content and the ease for forming derivatives are some of the benefits arising out of the use of these biopolymers. Thus, it is possible to functionalize these materials by introducing some other heteroatom of a simple form whereby the resulting graphene is doped with that heteroatom.

Other preferred biopolymers are protein in nature such as gelatins of diverse origin and collagens.

These non-crystallizable and capable of forming hydrogels biopolymers have the ability of conformally coating surfaces, faithfully reproducing the roughness of the surface of the substrate.

The surfaces or substrates that can be coated through the process described in the present invention may be quartz, glass, ceramics, ceramic pastes, plastic, etc, and can be transparent or opaque, rigid or flexible, flat or not flat, etc.

The method for preparing graphene films from biopolymers on non-metal substrates comprises the following stages:

First, a sample of a biopolymer or a derivative of the biopolymer is dissolved in water at the suitable pH. By way of non-limiting example, the chitosan can be dissolved first in concentrated acetic acid and then an aliquot of this acid solution is diluted with milli-Q water to the required concentration. The pH of this chitosan solution is acid. In another example of the present invention sodium alginate is used as starting biopolymer and is dissolved in milli-Q water at the desired concentration. The pH value of this alginate solution is basic.

In a second stage, the aqueous solution of the biopolymer or its derivative is used to carry out the coating of the substrate on which the graphene will be formed; said substrate has been previously subjected to a suitable cleaning process. This cleaning may consist of the use of a neutral surfactant, followed by rinsing with distilled water, drying and a final process of ozonation. In the case of quartz and special glasses the pretreatment of the same with hydrochloric acid is convenient with the purpose of increasing the hydrophilicity of the surfaces.

A convenient way of depositing the aqueous solution of the biopolymer on the substrate is by immersion of the substrate in said solution or by using the spin coating technique. By controlling the biopolymer concentration and other conditions of operation such as the speed of rotation, it is possible to control the thickness of the biopolymer layer which is deposited on the substrate. An additive or co-solvent can be added in some substrates, to facilitate the coating process.

The thickness of the biopolymer deposited layers may vary between 1 and 1000 nanometers, preferably 1 nm.

The coating made with the biopolymer solution has very low roughness and faithfully reproduces the drawings and models that the coated surface has. This is essential in the present invention and could not have been predicted based on the state of the art. Thus, when a coating of a glass substrate is carried out with a crystallizable biopolymer solution such as sucrose or starch, the profilometry image reveals the emergence of little crystals on the glass support, so the formation of a uniform film is not achieved. This type of compounds is not usable for obtaining graphene according to the present method due to the fact that they do not form a continuous two-dimensional surface. In the present invention, the used biopolymers do not crystallize, so they form a uniform film covering the substrate, thus avoiding the disadvantages generated by using polymers that crystallize.

Once the thin layer of the biopolymer or of a suitable derivative has been formed, we can optionally proceed to its conditioning by hydrothermal processes such that the biopolymer chains are provided with the opportunity of a certain restructuring and reorientation after once they have been arranged on the surface of the substrate. This hydrothermal treatment consists of passing over the coated surface a stream of nitrogen saturated with water vapor at the temperature of between 100 and 250° C. for 30 min to several hours, preferably up to 3 hours.

Finally, a thermal decomposition or carbonization of the biopolymer deposited on the surface of the substrate in the absence of oxygen (graphitization) is carried out at temperatures below 1200° C., preferably between 400° C. and 650° C. This temperature allows using a wide range of substrates and in particular glasses where the graphene layer is formed after the thermal treatment. Surprisingly this method does not require catalyst and, specifically, is carried out on non-metal substrates. The number of resulting graphene layers varies according to the thickness of the biopolymer layer, noting a reduction in the thickness of the film during the carbonization process of around 50%. The stage of thermal decomposition can also be carried out in two stages, both in the absence of oxygen, the first one at a temperature lower than 300° C. in the presence of humidity and the second one at a temperature below 1200° C. without humidity. Likewise, the first stage can occur through a heating system that is different from the second one and so is possible to combine a heating stage in electric oven with another one by microwaves, among other combinations.

The decomposition of the biopolymers leads to the generation of sp2 carbons, together with sp3 carbon atoms joined to oxygen atoms. In the case of the graphene films obtained by decomposition of chitosan in addition to the presence of C atoms, the presence of sp2 nitrogen atoms bearing or not positive charge is observed, such as it is confirmed by the X-ray photoelectronic spectra (XPS).

Optionally and before carrying out the coating of the substrate with biopolymer solution, the deposition of a metal layer on the surface of the substrate can be carried out, this metal layer having less than 10 nm thick, such that it is transparent to the UV and visible radiations. This thin metal layer catalyzes the stage of thermal decomposition or graphitization and allows the substrate-graphene assembly to be transparent.

Since it is a transparent metal layer, it can be integrated in the structure which will directly have applications in the microelectronics, electronics, opto-electronics or photovoltaics industry (electronics in general), without the need of additional stages to remove said layer.

If the coating is carried out with a biopolymer containing heteroatoms or with a biopolymer that has been modified by functionalization with heteroatoms, then the graphene resulting from the chemical decomposition may have doping (heteroatoms) in its structure.

The biopolymer used, e.g. ammonium alginate, can be previously subjected to a N-type or P-type doping process in aqueous solution, to obtain in this way N-type or P-type doped graphene.

When the biopolymer is chitosan, the graphenic film made is doped with a variable percentage of nitrogen depending on the treatment and the conditions (N-type doping), given that chitosan has nitrogen atoms in its structure.

The pre-treatment of the biopolymer through a process of boration with sodium borate in aqueous solution would give rise to the biopolymer doped with boron and the resulting graphene after the thermal decomposition treatment would contain boron (P-type doping).

Once the first graphene film is formed on the substrate, it is possible to repeat the method by depositing a second layer of biopolymer (it may be the same or a different polymer from the one used in the first deposition) which will be subjected to a process of thermal decomposition or carbonization, in this way several graphene films can be formed on the substrate. If the method is repeated twice two graphenic films will be formed, such that, depending on the biopolymers used (identical, different, doped or non-doped) pristine graphenic sheets (without doping), with similar P-P, N-N doping or with different P-N and N-P doping will be obtained.

The resistance of the graphene formed following the method of the present invention is 10-20 Ohms/square when it includes the thin metal layer and it derives from the ability of these biopolymers of conformally coating surfaces with thickness equal to or higher than 1 nm and with roughness on the order of 1 nm, as well as from the tendency of the biopolymers to form graphenic materials.

The resulting graphene layers can be characterized by a wide variety of spectroscopic and imaging techniques. The Raman spectra obtained by focused beam show the homogeneity of the graphene layer formed for films of dimensions of $1\times1$ cm$^{-2}$.

The electrical conductivity of the graphene films or of a few graphene layers depends on the nature of the substrate and the form of measure. On glass substrates (without metal layer) by measuring through a head of four tips measures between 500 and 10,000 Ohms/square are obtained. These values are significantly reduced when the measures of conductivity are carried out by depositing gold as contacts on the graphene layer and by measuring the conductivity through said contacts. On substrates that include the thin metal layer and measuring through gold contacts, resistances of between 10-20 Ohms/square are determined. In contrast, the precursor before being converted into graphene is shown as an insulator in any surface on which it is deposited.

DESCRIPTION OF THE FIGURES

To complement the foregoing description, this specification is accompanied by a set of figures where with merely illustrative and not limiting character the following has been represented.

PREFERRED EMBODIMENT OF THE INVENTION

Figure 1:
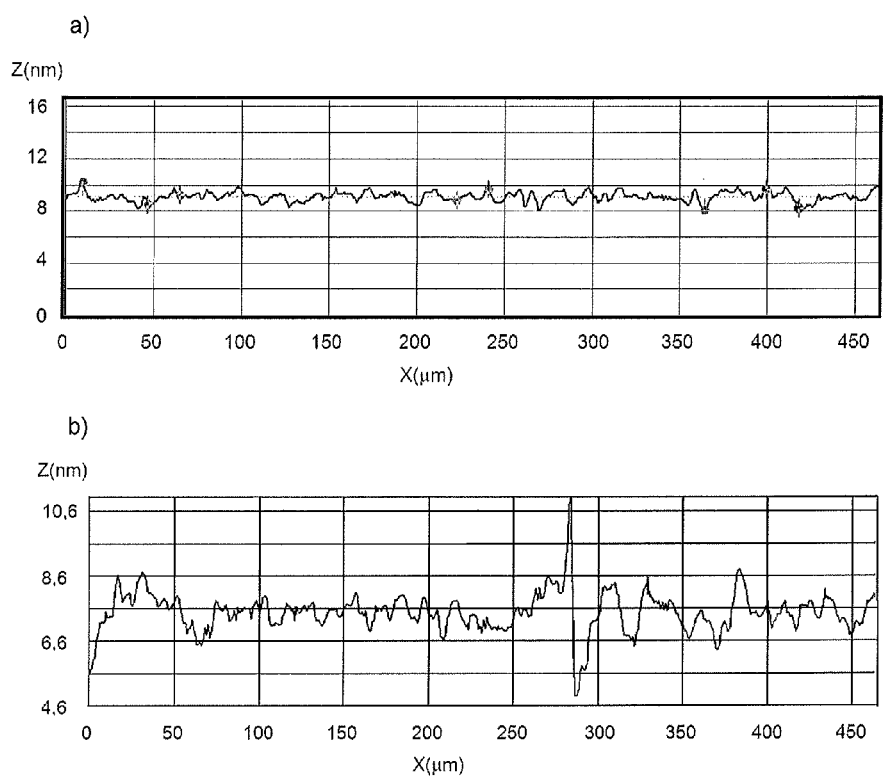
FIG. 1 a) graphic that measures the thickness (Z) of the graphene layer made from chitosan by measuring with a mechanical tip that scans the surface separating different distances (X) of the same, and b) graphic showing the thickness (Z) of said graphene layer.
Figure 2:
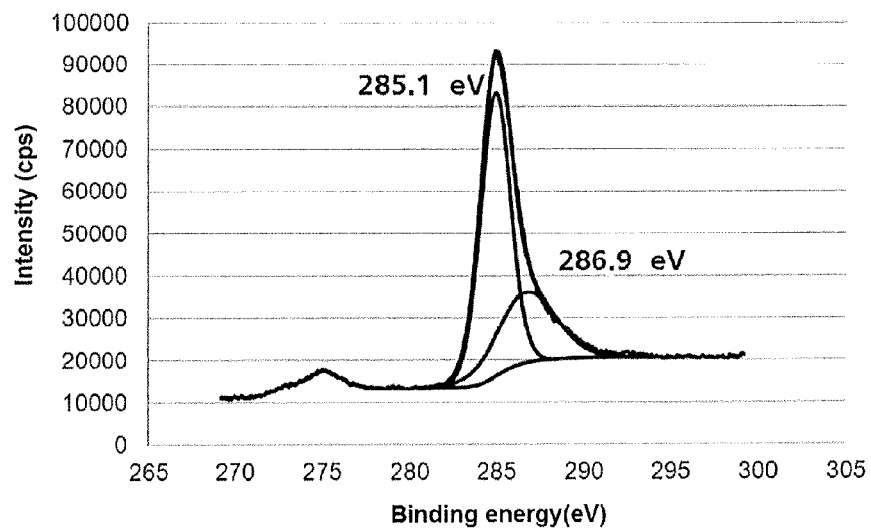
FIG. 2 shows a XPS spectrum of a representative sample of these graphenic materials obtained from chitosan. (a) The XPS of 1s Carbon and (b) the XPS of the 1s Nitrogen are depicted.
Figure 2:
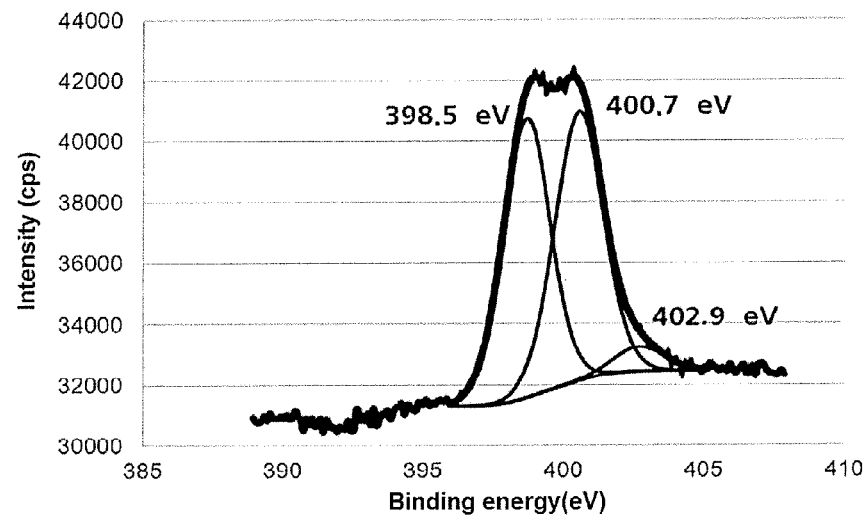
Figure 3:
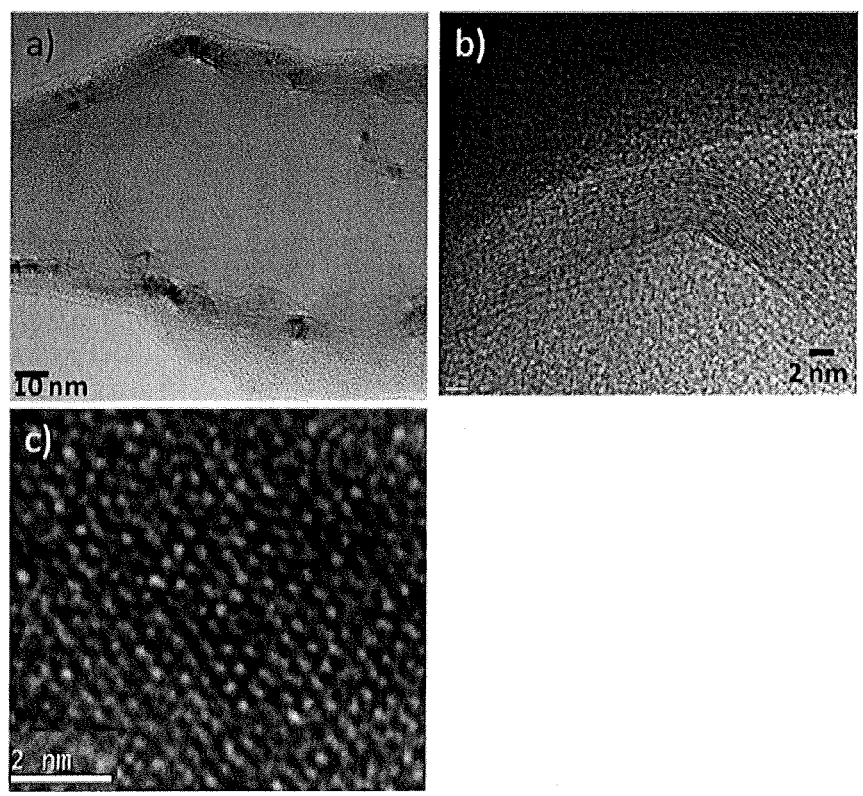
FIG. 3 shows electron transmission spectroscopy photographs of a graphitized chitosan film of 10 nm of thickness at different resolutions. In figure a) the graphitized chitosan film is observed with resolution of 10 nm. Figure b) shows the edges of the film with higher resolution (2 nm) where the different graphene layers can be clearly distinguished. A higher resolution gives rise to figure c) where the carbon hexagons characteristic of a graphitic structure are distinguished.

To facilitate the understanding of the invention, next in an illustrative and not limitative manner, some examples for the preparation of the graphene coatings based on the present invention are described.

Example 1

Preparation of a Graphene Coating by Carbonization of Ammonium Alginate on a Glass Surface First, a solution of ammonium alginate is prepared by suspending commercial alginic acid (Sigma, CAS:9005-32-7, reference A7003-250G, 0.2 g) in 10 ml of Milli-Q $H_2O$ and adding a saturated solution of $NH_4OH$ until reaching a constant pH value equal to 8, thus achieving the solubilization of the polysaccharide.

The resulting solution is filtered on a Nylon filter and is arranged in a spin coating apparatus. On the other hand, a 1×1 $cm^2$ piece of glass is extensively washed with isopropanol, Alconox detergent and finally with Milli-Q water. The glass is subjected to an ozonator for fifteen minutes before placing it in the spin coating apparatus. The formation of the film is carried out at 2000 rpm for fifty seconds. The film is left until it is dry and is introduced in an oven where it is heated to 200° C. for 2 hrs under a stream of argon saturated with water vapor. After that time the graphitization is carried out by gradual heating at 5° C. to 600° C., maintaining this temperature for 6 hrs. The resulting sample is characterized by Raman spectroscopy, making several spectra in equally distributed points along the length and width of the surface. Standardization of the spectra reveals that the film is homogeneous and that it corresponds to a graphenic material. The thickness of this layer was determined by optical profilometry turning out to be 1 nm. X ray photoelectron spectroscopy indicates that the carbon present in the sample corresponds mostly to $sp^2$ carbons. The layer resistance of the resulting material turns out to be of 3,500 Ohms/square.

Example 2

Preparation of a Graphene Coating Doped with Nitrogen by Chitosan Carbonization

An aqueous solution is prepared by dissolution of commercial chitosan (Aldrich ref. 448869-50G, CAS:9012-76-4) in concentrated acetic acid (56 mg of chitosan in 0.225 ml of acetic acid) followed by dilution of this acetic solution in Milli-Q water (15 ml). The resulting aqueous solution is placed on the deposit of a spin coating apparatus and it is proceeded to the coating of a glass surface as indicated in Example 1. The graphitization method followed for the chitosan is also identical to that described in example 1. The sample of graphenic material obtained from the chitosan shows uniform Raman spectra throughout the whole surface and indistinguishable from those registered for the graphene sample obtained from alginate. The XPS spectrum reveals the presence of a 7% of N which corresponds with N sp2 and N sp2 with positive charge. The thickness of the film was 20 nm and the conductivity of the same was 4500 Ohms/square.

Example 3

Preparation of a Graphene Coating from Chitosan on a Glass Surface on which a Nanometric Layer of Nickel Metal has been Deposited The preparation of the glass substrate with a nanometric layer of nickel is carried out prior to the deposition of the chitosan layer in a steam deposition chamber of the metal by sublimation operating at a temperature of 1500° C. and a vacuum of $10^{-5}$ mbar. The thickness of the nickel layer is controlled by the deposition time of the steam and turns out to be of 5 nm. The glass support coated with nickel has a transparency above 90%.

On this transparent support a thin chitosan film is deposited operating with a solution such as the one described in example 2 and using a spin coating apparatus operating at 3000 rpm. The thickness of the resulting chitosan film is 2 nm and its conductivity is high and in any case greater than 1 MegaOhms/square.

The substrate with the nanometric layers of nickel and chitosan is subjected to carbonization as described in example 2. Therefore graphene films on a transparent substrate with a high conductivity can be obtained without the need of proceeding to a stage of graphene transfer from one surface to another. The values of layer resistance obtained are 10-20 Ohms/square.

Example 4

Preparation of a Graphene Coating from Chitosan on a Glass Surface by Microwave Heating For the embodiment of this example a chitosan solution as the one shown in example 2 is prepared and it is proceeded to a coating of a clean glass substrate according to the method also described in example 2. The difference with example 2 is the carbonization method.

The chitosan film is treated at 200° C. for 2 hrs in order to initiate a transformation of the chitosan derived from its partial dehydration. Then the material to be carbonized is transferred into a microwave oven and is heated up at a power of 1000 W for 20 min under inert atmosphere.

Example 5

Preparation of a Graphene Coating Doped with Boron from a Boronated Derivative of Ammonium Alginate The method of this example is identical to the one described in example 1, but using a boronated derivative of alginate in place of a commercial sample. This derivative is prepared in advance by reaction of a solution (5 ml) of sodium alginate (10 mg) with sodium borate (1 mg) at room temperature for 2 hrs. After this time, it is proceeded to the preparation of the coating by the spin coating apparatus, followed by carbonization at a temperature of 600° C. Microscopy-EDX Analysis reveals the presence of boron as a doping agent for graphene in a percentage. The conductivity of the doped film is of 250 KiloOhms/square.

Example 6

Preparation of a Multilayer Graphene Coating each one with a Different Heteroatom The present example consists of the preparation of a coating containing two graphene layers each one with a different heteroatom. For this, first it is proceeded to the embodiment of example 3. Next, on the resulting surface which already contains a graphene film arranged on a transparent glass with a nickel film, a layer of boronated ammonium alginate prepared as described in the example 5 is arranged and it is proceeded to its graphitization by thermal treatment. The final result is a substrate on which one thin nickel layer of 10 nm of thickness and two graphene layers are deposited, the first of which contains nitrogen in its composition and the second one contains boron.

Example 7

Preparation of Graphene on Quartz from Starch

Before proceeding to the spin coating and depositing the nanometric layer of starch, the 2×2 $cm^2$ square piece of quartz is immersed in a aqueous solution of 0.5 M hydrochloric acid. This treatment extends for a week at room temperature. After this time, the quartz piece is recovered, is washed with Milli-Q water and undergoes ozonation.

Then, a thin film of commercial naturally occurring starch that has been dissolved in Milli-Q water is arranged on the surface through the spin coating technique at a speed of 2000 rpm (100 mg/L).

The surface is left until it is dry in a clean environment and is thermally treated at 250° C. for 1 hr under a constant flow of nitrogen saturated with water vapor. After that time, the starch layer is graphitized at 850° C. for 5 hrs under nitrogen atmosphere, by gradual heating to 10° C./min from 250° C. to 850° C. The resulting material shows a conductivity of 1100 Ohms/square.

Example 8

Preparation of a Ceramics with Graphene Coating by Carbonization of an Ammonium Alginate Layer Deposited on Pressed Ceramic Precursor On a pressed ceramic precursor element with tile dimensions and before introducing it in an oven, a layer of a solution of ammonium alginate prepared as indicated in example 1 is deposited. The deposition is carried out conveniently by passing in a conveyor belt at a speed of 500 cm per minute a curtain of the solution containing ammonium alginate. Then the ceramic element is introduced into a bake furnace customary in ceramic installations and the pressed containing the alginate layer. It is heated at a temperature of 1200° C. for 1 hr in the total absence of oxygen. The data of Raman and X-ray photoelectron spectroscopy indicate the presence of the graphene in the surface of the ceramic element after the baking. The resistance of the surface was 1500 Ohms/square.

The invention claimed is:

1. A method for the preparation of graphene or graphenic materials films on non-metal substrates comprising the following stages:
    preparation of an aqueous solution of a non-crystallizable water-soluble biopolymer capable of forming hydrogels, or a derivative of said biopolymer,
    coating of the substrate with the aqueous solution of the biopolymer prepared in the previous stage,
    conditioning of the aqueous solution of the biopolymer by means of a hydrothermal process wherein the coated surface is subjected to a flow of nitrogen saturated with water vapor at the temperature of between 100 and 250° C. for at least 30 minutes,
    thermal decomposition of the biopolymer deposited on the substrate in the absence of oxygen at temperatures equal to or below 1200° C. to form the graphene or graphenic material film.

2. The method for the preparation of graphene or graphenic materials films according to claim 1 wherein the coating of the substrate with the aqueous solution of the biopolymer is carried out through immersion of the substrate in said solution or by using the spin coating technique.

3. The method for the preparation of graphene or graphenic materials films according to claim 1 wherein the biopolymer is an alginate of any origin or a derivative of alginate.

4. The method for the preparation of graphene or graphenic materials films according to claim 3 wherein the biopolymer is ammonium alginate.

5. The method for the preparation of graphene or graphenic materials films according to claim 3 wherein the biopolymer is an ammonium alginate that has been previously subjected to an N-type doping process in aqueous solution, resulting in a graphene or graphenic materials film doped with sp2 nitrogen and/or sp2 nitrogen with positive charge.

6. The method for the preparation of graphene or graphenic materials films according to claim 3 wherein the biopolymer is an ammonium alginate that has been previously subjected to a P-type doping process in aqueous solution, resulting in a P-type doped graphene or graphenic materials film.

7. The method for the preparation of graphene or graphenic materials films according to claim 6 wherein the biopolymer is an ammonium alginate subjected to a boration process (P-type doping) with sodium borate in aqueous solution.

8. The method for the preparation of graphene or graphenic materials films according to claim 1 wherein the biopolymer is chitosan of any origin, giving rise to a graphene film or graphenic material doped with nitrogen.

9. The method for the preparation of graphene or graphenic materials films according to claim 8 wherein it has been used chitosan, resulting in a graphene or graphenic materials film doped with sp2 nitrogen and/or sp2 nitrogens with positive charge.

10. The method for the preparation of graphene or graphenic materials films according to claim 1 wherein the biopolymer is a carragenate of any origin.

11. The method for the preparation of graphene or graphenic materials films according to claim 1 wherein the biopolymer is a naturally occurring starch.

12. The method for the preparation of graphene or graphenic materials films according to claim 1 wherein the non-metal substrate is quartz, glass, ceramics, ceramic paste or plastic.

13. The method for the preparation of graphene or graphenic materials films according to claim 1 wherein the thermal decomposition of the biopolymer is carried out at a temperature between 400° C. and 650° C.

14. The method for the preparation of graphene or graphenic materials films according to claim 1 wherein the thermal treatment is carried out in two stages, both in the absence of oxygen, the first stage at a temperature below 300° C. in the presence of humidity and the second stage at a temperature below 650° C.

15. The method for the preparation of graphene or graphenic materials films according to claim 1 wherein the deposited biopolymer solution film has a thickness of 1 to 1000 nm.

16. The method for the preparation of graphene or graphenic materials films according to claim 1 wherein the graphene or graphenic material film is a first graphene or graphenic material film, and wherein, once the first graphene or graphenic material film is formed, it is proceeded to the coating with a second layer of biopolymer or biopolymer derivative solution which is subjected to a second treatment of thermal decomposition to form a second graphene or graphenic material film.

17. The method for the preparation of graphene or graphenic materials films according to claim 16 wherein the first and second graphene or graphenic material films formed are pristine graphenic layers (without doping), or similar P-P or N-N doping, or different P-N or N-P doping, depending on the biopolymers or biopolymers derivatives used for the formation of each graphenic layer.

18. The method for the preparation of graphene or graphenic materials films according to claim 1 wherein the surface is quartz and the thermal decomposition of the biopolymer is carried out at 850° C.

19. The method for the preparation of graphene or graphenic materials films according to claim 1 wherein the surface is a ceramic paste and the thermal decomposition of the biopolymer is carried out at temperatures of 1200° C.

20. A method for the preparation of graphene or graphenic materials films comprising the following stages:
- preparation of an aqueous solution of a non-crystallizable water-soluble biopolymer capable of forming hydrogels, or a derivative of said biopolymer,
- deposition of a metal layer with a thickness of less than 10 nm on the surface of the substrate,
- coating of the metal layer with the aqueous solution of the biopolymer prepared in the previous stage,
- conditioning of the aqueous solution of the biopolymer by means of a hydrothermal process wherein the coated surface is subjected to a flow of nitrogen saturated with water vapor at the temperature of between 100 and 250° C. for at least 30 minutes,
- thermal decomposition of the biopolymer deposited on the substrate in the absence of oxygen at temperatures equal to or below 1200° C. to form the graphene or graphenic material film.

* * * * *